United States Patent
Liu

(10) Patent No.: US 11,418,255 B2
(45) Date of Patent: Aug. 16, 2022

(54) METHOD, DEVICE AND SYSTEM FOR CONTROLLING PROTECTION SWITCHING ON OPTICAL NETWORK

(71) Applicant: ZTE CORPORATION, Shenzhen (CN)

(72) Inventor: Jianguo Liu, Shenzhen (CN)

(73) Assignee: ZTE Corporation, Guangdong (CN)

( * ) Notice: Subject to any disclaimer, the term of this patent is extended or adjusted under 35 U.S.C. 154(b) by 56 days.

(21) Appl. No.: 17/018,978

(22) Filed: Sep. 11, 2020

(65) Prior Publication Data

US 2020/0412446 A1    Dec. 31, 2020

Related U.S. Application Data

(63) Continuation of application No. PCT/CN2018/116774, filed on Nov. 21, 2018.

(30) Foreign Application Priority Data

Mar. 12, 2018   (CN) .......................... 201810201971.0

(51) Int. Cl.
*H04B 10/08*   (2006.01)
*H04B 10/077*   (2013.01)

(52) U.S. Cl.
CPC ... *H04B 10/0775* (2013.01); *H04B 2210/072* (2013.01)

(58) Field of Classification Search
CPC .......... H04B 10/0775; H04B 2210/072; H04B 10/032; H04B 10/079; H04B 10/077;
(Continued)

(56) References Cited

U.S. PATENT DOCUMENTS

| 5,513,029 A * | 4/1996 | Roberts ................ H04B 10/035 |
| | | 359/333 |
| 2003/0067646 A1 | 4/2003 | Wan et al. |

(Continued)

FOREIGN PATENT DOCUMENTS

| CN | 1852055 A | 10/2006 |
| CN | 1859043 A | 11/2006 |

(Continued)

OTHER PUBLICATIONS

ZTE Corporation, First Office Action (CN), CN201810201971.0, dated Feb. 3, 2020, 11 pgs.

(Continued)

*Primary Examiner* — Hibret A Woldekidan
(74) *Attorney, Agent, or Firm* — USCH Law, PC

(57) ABSTRACT

The present disclosure relates to a method, a system and a computer readable storage medium for controlling protection switching on an optical network. The method for controlling protection switching on an optical network includes: determining a low-frequency signal for service protection, and modulating the low-frequency signal for service protection to a transmission channel of a service signal to be protected and transmitting the low-frequency signal; detecting the low-frequency signal over the transmission channel and acquiring transmission quality information of the low-frequency signal; and determining whether to perform protection switching according to the transmission quality information of the low-frequency signal.

10 Claims, 4 Drawing Sheets

(58) Field of Classification Search
CPC ........... H04B 10/0771; H04B 2210/075; H04J 14/0212; H04J 14/0295; H04J 14/0297; H04J 14/0287; H04J 14/0293; H04J 14/0291; H04J 2203/006; H04J 14/021; H04L 45/28
USPC ................ 398/5, 30, 25, 26, 27, 31, 32
See application file for complete search history.

(56) References Cited

U.S. PATENT DOCUMENTS

2011/0135301 A1    6/2011    Myslinski et al.
2019/0260493 A1*    8/2019    Chimfwembe ...... H04B 10/032

FOREIGN PATENT DOCUMENTS

| CN | 101043271 A | 9/2007 |
| CN | 1859043 B | 4/2010 |
| CN | 101043271 B | 11/2010 |
| CN | 102595259 A | 7/2012 |
| CN | 103457902 A | 12/2013 |
| CN | 104202205 A | 12/2014 |
| EP | 1990937 A1 | 11/2008 |

OTHER PUBLICATIONS

First Office Action, CN 201810201971.0, dated Mar. 2, 2020, 9 pgs.
International Search Report, PCT/CN2018/116774, dated Mar. 12, 2018, 8 pgs.
ZTE Corporation, Extended European Search Report, EP 18909864.3, dated May 26, 2021, 8 pgs.
ZTE Corporation, Intention to grant, EP 18909864.3, dated Jan. 31, 2022, 34 pgs.

\* cited by examiner

METHOD, DEVICE AND SYSTEM FOR CONTROLLING PROTECTION SWITCHING ON OPTICAL NETWORK

CROSS REFERENCE TO RELATED APPLICATIONS

The present application is a continuation of PCT Patent Application No. PCT/CN2018/116774, filed Nov. 21, 2018, which claims priority to Chinese Patent Application No. 201810201971.0, filed Mar. 12, 2018. The entirety of each of the above applications is incorporated herein by reference.

TECHNICAL FIELD

The present disclosure relates to but is not limited to the field of communication technology.

BACKGROUND

Due to the large quantity of transmission data in an optical network, a network failure would cause a great deal of damage to its service. Therefore, service protection in the optical network has been an important research topic in optical network applications. Since the optical network was applied in commerce, network protection has been highly emphasized. A large number of network protection schemes have been proposed in the application of optical network in the past thirty years. According to type of applied network, the schemes can be divided into a ring network protection method, a grid protection method and a linear network protection method; according to network level of protection, the schemes can be divided into multiplex section protection, channel protection and sub-network connection protection; according to the resource using method of protection, the schemes can be divided into n+1 protection and n:m protection; according to whether a preset resource exists, the schemes can be divided into a protection method and a recovery method. These schemes are all based on how to use network resources more reasonably and how to ensure the fastest protection using the simplest protection protocol. Little consideration is given to fault detection during protection switching.

SUMMARY

Some embodiments of the present disclosure provide a method, a device and a system for controlling protection switching on an optical network.

According to some embodiments, a method for controlling protection switching on an optical network comprises:

determining a low-frequency signal for service protection, and modulating the low-frequency signal for service protection to a transmission channel of a service signal to be protected;

detecting the low-frequency signal over the transmission channel, and acquiring transmission quality information of the low-frequency signal; and determining whether to perform protection switching according to the transmission quality information of the low-frequency signal.

According to some embodiments, a system for controlling protection switching on an optical network comprises: a low-frequency signal mapper, a low-frequency signal modulator and a low-frequency signal detector, wherein:

the low-frequency signal mapper is configured to determine a low-frequency signal for service protection and transmit low-frequency signal information to the low-frequency signal modulator and the low-frequency signal detector;

the low-frequency signal modulator is configured to modulate the low-frequency signal for service protection to a transmission channel of a service signal to be protected; and the low-frequency signal detector is configured to detect the low-frequency signal over the transmission channel, acquire transmission quality information of the low-frequency signal, and determine whether to perform protection switching according to the transmission quality information of the low-frequency signal.

According to some embodiments, a method for controlling protection switching on an optical network comprises:

acquiring low-frequency signal information for service protection;

detecting a low-frequency signal for service protection over a transmission channel of a service signal, to acquire transmission quality information of the low-frequency signal; and determining whether to perform protection switching according to the transmission quality information of the low-frequency signal.

According to some embodiments, a device for controlling protection switching on an optical network comprises: a low-frequency signal mapping unit and a low-frequency signal detecting unit, wherein:

the low-frequency signal mapping unit is configured to acquire low-frequency signal information for service protection; and the low-frequency signal detecting unit is configured to detect a low-frequency signal for service protection over the transmission channel of the service signal, acquire transmission quality information of the low-frequency signal, and determine whether to perform protection switching according to the transmission quality information of the low-frequency signal.

According to some embodiments, a device for controlling protection switching on an optical network comprises a memory and a processor, wherein the memory stores a program that, when read and executed by the processor, implements the method for controlling protection switching on the optical network in any one of the embodiments.

Compared with related art, in an embodiment of the present disclosure, it is determined whether to perform protection switching by detecting transmission quality of a low-frequency signal transmitted with a service signal. In the embodiment, because the low-frequency signal is transmitted with a service signal, the quality of the low-frequency signal may directly show signal quality of the service signal in a channel. Because signal rate of the low-frequency signal is low, and thus may implement full-channel detection for once with respect to a service signal of a higher rate, thereby the detection rate is higher and a detection cost is less. In one embodiment, the solution provided in the present disclosure does not need to separate signals of channels of all wavelengths, but detection may be performed directly. Therefore, the solutions provided in the present disclosure can greatly improve fault detection efficiency and accuracy. That is to say, the solutions in the embodiments of the present disclosure can reduce service protection cost and improve service protection efficiency.

Other features and advantages of the present disclosure are described in the following, and some features and advantages are obvious based on the description or may be known through implementation of the present disclosure. The objective and other advantages may be implemented and obtained through the specification, claims and structures specifically indicated in drawings.

BRIEF DESCRIPTION OF THE DRAWINGS

The drawings provide a further understanding on the technical solutions of the present disclosure, and form a part of the specification. The drawings and embodiments of the present disclosure are used to describe the technical solutions of the present disclosure.

DETAILED DESCRIPTION

Figure 1:
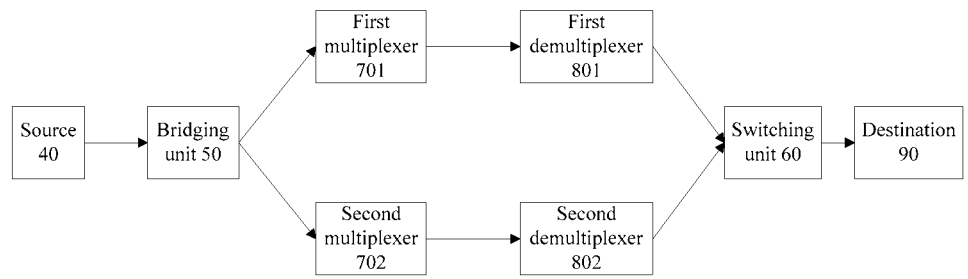
FIG. 1 is a schematic diagram of a basic protection system in a related art.

In order to clarify the objective, the technical solutions and the advantages of the present disclosure, embodiments of the present disclosure are described in detail with reference to the drawings. It shall be noted that in a case where there is no conflicts, the embodiments in the present disclosure and the features in the embodiments may be combined randomly.

The steps shown in the flowcharts of the drawings may be performed in a computer system such as a set of computer-executable instructions. Also, while a logical order is shown in the flowcharts, in some cases, the steps shown or described may be performed in a different order.

Fault detection methods common in the current protection switching process may be simply divided into two types, electrical layer detection and optical layer detection.

For an optical network, the so-called electrical layer detection requires to complete photoelectric conversion for signals, decode the signals transmitted by the network according to a transmission service protocol, and directly detect decoded service signals and overhead thereof to realize network protection. Because this method requires decoding signals, it may only be implemented for specific services of the optical network; and for the decoding process, there may be different implementations for different services and different protocol modes may be defined. In addition, detection cost will be greatly increased when service rate is increased. Therefore, a protection solution implemented based on this method can not work in different services, is costly and may only be suitable for the edge position (service access position) of the optical network.

In order to implement protection switching with lower cost to facilitate implementing service-independent protection on an optical transmission section (OTS), an optical multiplex section (OMS), and an optical channel (OCH) of an optical network, another fault detection method is to detect parameters of a pure optical layer, such as optical power and optical signal to noise ratio (OSNR). In the case of dense waves, an optical fiber contains dozens or even hundreds of optical channel signals, and if detection is to be completed on each channel of signals, filtering of an optical layer needs to be implemented on the channels to analyze power and OSNR of each channel of optical signals, which is low in efficiency but high in cost. In addition, when a subnet connection point is integrated to a service drop point, especially after coherent demodulation is available, in order to implement a lower-cost transmission scheme, the power detection of pure optical signals fails under the condition that the service is not demultiplexed and then provided to a service receiver for processing.

As optical networks are performing transmission increasingly faster, it is common that a signal transmission rate of a single channel is at a rate level of 10G, which means that when a transmission service rate of a signal optical channel exceeds 10G, frequency spectrums under 10G are wasted because they do not provide any transmission service. Therefore, the present disclosure provides a solution for implementing protection switching by using a channel transmission-associated low-frequency signal in a high-speed optical network.

FIG. 1 is a schematic diagram of a basic protection system in a related art, which implements protection for an optical channel. In the figure, protection for one optical channel is realized. As shown in FIG. 1, a source 40 converts a service signal into an optical signal of an optical channel and sends the optical signal to a bridging unit 50. The bridging unit 50 may transmit the optical signal from the source 40 to a working channel and a protection channel simultaneously, or one of the working channel and the protection channel, according to a requirement of a protection switching protocol. Herein, a multiplexer of the working channel is a first multiplexer 701, and a multiplexer of the protection channel is a second multiplexer 702. The first multiplexer 701 and the second multiplexer 702 implement an optical multiplexing function in the optical network, and may multiplex a plurality of optical channel signals from a bridging unit 50 into one transmission optical fiber. The multiplexed optical signals are transmitted in the optical fiber and respectively reach a first demultiplexer 801 of the working channel and a second demultiplexer 802 of the protection channel. After the first demultiplexer 801 and the second demultiplexer 802 implement demultiplexing, the optical signal of the working channel and the optical signal of the protection channel are together transmitted to a switching unit 60. The switching unit 60 may choose one channel of signals in the working channel or in the protection channel to be transmitted to a destination 90 of the service as required by the protocol.

In the system, in order to realize a protection switching requirement, a signal from the working channel (output by the first demultiplexer 801) and the protection channel (output by the second demultiplexer 802) needs to be detected at a position of the switching unit 60. An optical power or OSNR from the first demultiplexer 801 and the second demultiplexer 802 may be detected to implement protection (FIG. 1 does not show a detecting unit for implementing the detection). As shown previously, such a protection system can not accurately detect transmission quality of a service signal after the service signal passes the bridging unit 50, the first multiplexer 701 and the first demultiplexer 802 (working channel). In particular, in order to separately detect the optical power and OSNR from any optical channel of the source 40, the detection can not be implemented until the first demultiplexer 801 and the second demultiplexer 802 independently filter optical signals of their respective optical channels, which is costly.

Figure 2:
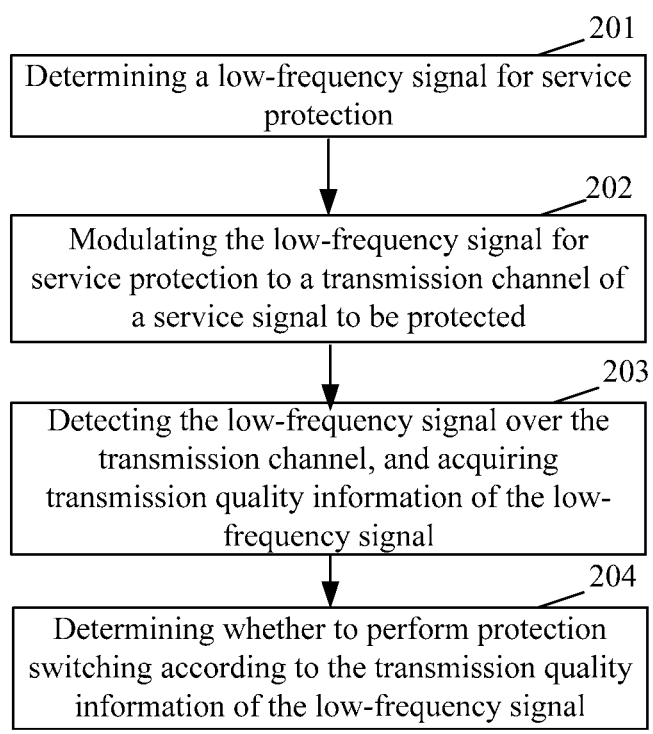
FIG. 2 is a flowchart of a method for controlling protection switching on an optical network according to an embodiment in the present disclosure.

FIG. 2 is a flowchart of a method for controlling protection switching on an optical network according to an embodiment in the present disclosure, including:

step 201: determining a low-frequency signal for service protection, step 202: modulating the low-frequency signal for service protection to a transmission channel of a service signal to be protected;

step 203: detecting the low-frequency signal over the transmission channel, and acquiring transmission quality information of the low-frequency signal; and step 204: determining whether to perform protection switching according to the transmission quality information of the low-frequency signal.

Herein, the low-frequency signal is of a frequency at an edge of the service signal and is so different from a central frequency of a service signal to be transmitted in the system as to form frequency isolation. For example, if the service per se is within a frequency range of 10G, the central frequency is 10G and a service signal power under 1G is generally ignored, a frequency under 1G may be a low frequency. For another example, when a rate frequency of a service is 100 GHz, a range of 0.9 to 1 MHz may be taken as a frequency range of the low-frequency signal for service protection. These are only examples. Alternatively, the low-frequency signal may be a signal within other low-frequency ranges.

Herein, in step 201, the low-frequency signal modulated to a protected entity may be any signal such as a simple sine wave, a pseudo random signal or an auxiliary protection protocol.

It shall be noted that the low-frequency signal may either be preconfigured or be configured according to requirements during operation of the system.

In one embodiment, the step 201 of determining the low-frequency signal for service protection includes:

when there are a plurality of protection entities, determine a low-frequency signal for service protection for each protection entity. One method is: determining a low-frequency band for the service protection, dividing the low-frequency band into a plurality of frequency bands, and mapping each of the frequency bands to a protection entity.

The step of modulating the low-frequency signal for service protection to a transmission channel of a service signal to be protected includes:

modulating the low-frequency signal, which has a mapping relationship with a protection entity where the service signal to be protected locates, to the protection entity.

Herein, the protection entity refers to a protection execution unit, and the protection entity is, for example, an optical channel or a multiplex section. For example, the protection entity is the optical channel if the protection is based on the optical channel, and the protection scope is the multiplex section if the protection is based on the multiplex section. When a low-frequency signal (which has a mapping relationship with a protection entity where the service signal to be protected locates) is mapped to the protection entity, for example, when the service signal is transmitted on a certain optical channel, the low-frequency signal that has the mapping relationship with the optical channel is modulated to the optical channel.

Alternatively, if there is only one protection entity, it is only necessary to determine a low-frequency signal corresponding to the protection entity.

In one example, different protection entities correspond to low-frequency signals of different frequencies. For example, the protection entities are classified and numbered, a frequency range for service protection is divided and mapped with the protection entities. For example, when a rate frequency of a service is 100 GHz, it may be defined that 0.9 to 1 MHz is a frequency range of the low-frequency signal for service protection. When there are n protection entities, the n protection entities may be respectively mapped to frequency positions of 0.9+0.1/n. This is only an example. Alternatively, mapping may be performed in other manners. Besides, the frequency range of the low-frequency signal may be set as needed.

Herein, in step 202, the low-frequency signal may be modulated in a plurality of ways such as phase modulation and amplitude modulation, which is not limited in the present disclosure.

Herein, in step 202, the low-frequency signal may be modulated into the service signal at the source, converted to an optical signal and then transmitted. Alternatively, the optical signal transmitted from the source may be modulated, and the low-frequency signal may be modulated into the optical signal and transmitted. The modulated optical signal is transmitted to a bridging unit which further transmits the optical signal to a multiplexer of a working channel and/or a multiplexer of a protection channel, and then transmitted to a destination by the multiplexer. Alternatively, modulation may be performed at another position during transmission, for example, the modulation is performed at the bridging unit or at the multiplexer.

In one example, in the step 203, detecting the low-frequency signal over the transmission channel includes: detecting the low-frequency signal at any position of the transmission channel after the position for modulating the low-frequency signal. That is, the low-frequency signal may be detected at any position after modulating the low-frequency signal. The position at which the low-frequency signal is detected is a detection position. It may be determined whether a fault exists over the transmission channel before the detection position. For example, a low-frequency signal may be detected over a transmission channel between a bridging unit and a multiplexer or between a multiplexer and a demultiplexer or between a multiplexer and a switching unit. Alternatively, a low-frequency signal may be detected at a position where the switching unit locates.

In one example, in the step 203, detecting the low-frequency signal over the transmission channel includes:

detecting the low-frequency signal, that has a mapping relationship with a single protection entity, over the transmission channel; or detecting a plurality of low-frequency signals over the transmission channel, each of the plurality of low-frequency signals mapping a protection entity. That is, each low-frequency signal may be detected separately, or low-frequency signals corresponding to a plurality of protection entities may be detected simultaneously. For example, frequency spectrums of a plurality of low-frequency signals are detected to determine whether there is a fault in the mapped protection entity according to the frequency spectrums at different frequency rates. Compared with a related art, in which detection can not be performed until an optical signal of each protection entity is filtered separately, the present disclosure may detect a plurality of protection entities simultaneously, thereby detection cost is reduced.

One or more service signals may be transmitted over the transmission channel. When there are a plurality of service signals, each low-frequency signal for protecting the plurality of service signals may be detected simultaneously.

Herein, in step 203, transmission quality information of the low-frequency signal includes at least one of the following: a frequency spectrum of the low-frequency signal, an error rate of the low-frequency signal, whether protocol information carried in the low-frequency signal has an error, and an optical signal to noise ratio of the low-frequency signal. The present disclosure is not limited hereto. Alternatively, other information that can show transmission quality of the low-frequency signal may also be included in the present disclosure. The step of acquiring the transmission quality information of the low-frequency signal includes at least one of the following: acquiring a frequency spectrum of the low-frequency signal, acquiring an optical signal to noise ratio of the low-frequency signal, acquiring an error rate of the low-frequency signal, and acquiring protocol information carried in the low-frequency signal and judging whether the protocol information has an error. Herein, the frequency spectrum of the low-frequency signal may show whether there is a low-frequency signal of a corresponding frequency. For example, when a range of 0.9 to 1 MHz is used to perform service protection on n protection entities, after acquiring frequency spectrum information, if there is no frequency spectrum information at a certain frequency in the range of 0.9 to 1 MHz, the transmission quality of the low-frequency signal corresponding to the certain frequency is poor (no signal), and there is a fault to the protection entity corresponding to the low-frequency signal, and protection switching is required.

In one example, the step 204 of determining whether to perform protection switching according to the transmission quality information of the low-frequency signal may be:

determining whether to perform protection switching according to the frequency spectrum of the low-frequency signal, for example, protection switching is performed on a protection entity if there is no frequency spectrum information of a frequency corresponding to the protection entity;

determining whether to perform protection switching according to the error rate of the low-frequency signal, for example, protection switching is performed when the error rate is larger than a preset value;

determining whether to perform protection switching according to whether protocol information carried in the low-frequency signal has an error, for example, the low-frequency signal may carry some information (i.e., protocol information), and the information is known, and in this way, the information carried in the low-frequency signal may be compared with the known information to determine whether there is an error and to determine whether to perform protection switching;

determining whether to perform protection switching according to the optical signal to noise ratio of the low-frequency signal, for example, the protection switching is performed when the optical signal to noise ratio is larger than a preset optical signal to noise ratio threshold.

It shall be noted that the above are only examples, and the protection switching may be performed according to a parameter used for judging low-frequency transmission quality.

Figure 3:
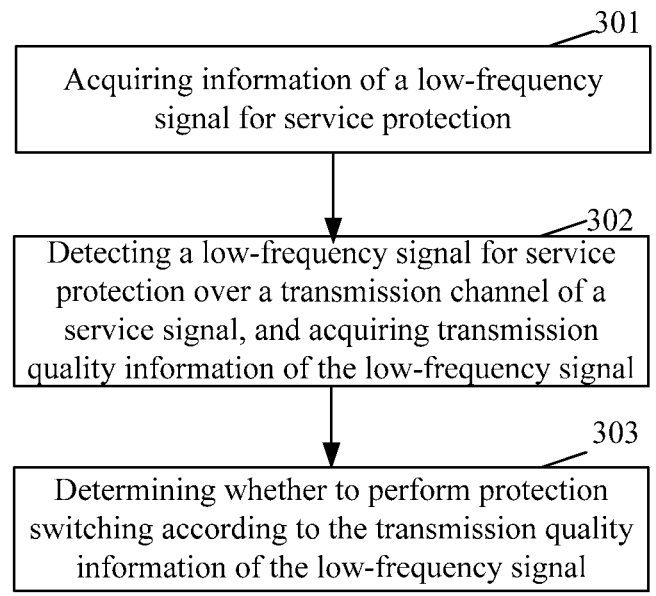
FIG. 3 is a flowchart of a method for controlling protection switching on an optical network according to another embodiment in the present disclosure.

FIG. 3 is a flowchart of a method for controlling protection switching on an optical network according to another embodiment in the present disclosure, including:

step 301: acquiring information of a low-frequency signal for service protection;

step 302: detecting a low-frequency signal for service protection on a transmission channel of a service signal, and acquiring transmission quality information of the low-frequency signal; and step 303: determining whether to perform protection switching according to the transmission quality information of the low-frequency signal.

In one example, the step 301 of acquiring information of a low-frequency signal for service protection may be to acquire a frequency of the low-frequency signal for service protection. The information of the low-frequency signal may either be preset or be obtained through configuration by an upper management system.

In one example, detecting a low-frequency signal for service protection may be to detect in a demultiplexed optical signal output from the demultiplexer, or to detect in an optical signal not demultiplexed by the demultiplexer, i.e., to detect in an optical signal multiplexed in one or more channels. For example, in a coherent system, the demultiplexer may not be used. In this case, detection on the low-frequency signal may be performed in an optical signal multiplexed from a plurality of channels transmitted from a transmitting terminal. Alternatively, the optical signal may be one received at another position, for example, an optical signal received before the demultiplexer.

In one example, in the step 302, the transmission quality information of the low-frequency signal includes at least one of the following: a frequency spectrum of the low-frequency signal, an error rate of the low-frequency signal, whether the protocol information carried in the low-frequency signal has an error, and an optical signal to noise ratio of the low-frequency signal. The step of acquiring the transmission quality information of the low-frequency signal at least includes at least one of the following: acquiring a frequency spectrum of the low-frequency signal, acquiring an optical signal to noise ratio of the low-frequency signal, acquiring an error rate of the low-frequency signal, and acquiring protocol information carried in the low-frequency signal and judging whether the protocol information has an error. Alternatively, the information may further be information that can judge the transmission quality of the low-frequency signal, which is not limited in the present disclosure, as long as the information can show the transmission quality of the low-frequency signal. Herein, the protocol information carried in the low-frequency signal refers to some information carried in the low-frequency signal, for example, control information may be carried in the low-frequency signal.

In one example, the step of determining whether to perform protection switching according to the transmission quality information of the low-frequency signal includes:

for any protection entity, determining whether to perform protection switching of a protection entity according to the transmission quality information of the low-frequency signal of the protection entity for service protection.

That is, the low-frequency signal of each protection entity for service protection is detected, and it is determined whether the protection switching of the protection entity is to be performed according to the low-frequency signal of the protection entity for service protection.

In one example, the step of detecting a low-frequency signal for service protection on a transmission channel of a service signal includes:

detecting the low-frequency signal—that has a mapping relationship with a single protection entity-over the transmission channel of the service signal; or detecting a plurality of low-frequency signals over the transmission channel of the service signal, each of the plurality of low-frequency signals mapping a protection entity. It shall be noted that to perform detection in the manner provided in the embodiment, the detection may be performed without separating optical signals of channels, which reduces service protection cost and improves service protection efficiency, compared with detecting by using an optical power or in the OSNR manner where optical signals of each channel have to be separated in the related art.

Herein, it may be preset which low-frequency signal to be used by each protection entity to perform service protection. The configuration may further be performed by a management system of the optical network, or the configuration may be negotiated and determined by the receiving terminal and the transmitting terminal.

There are a plurality of ways to detect a low-frequency signal, for example, by frequency domain signal sampling.

It shall be noted that in step 302, the detection may either be a detection of the protection channel or a detection of the working channel, or a detection of both the protection channel and the working channel.

Figure 4:
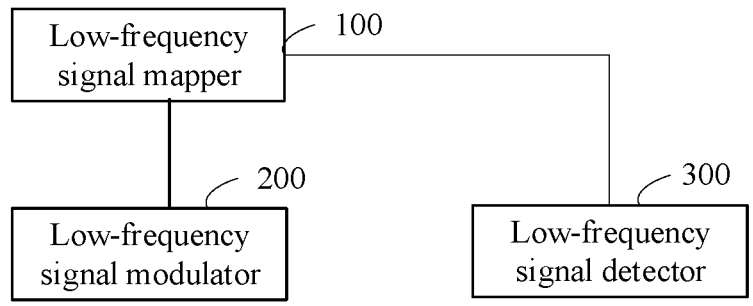
FIG. 4 is a schematic diagram of a system for controlling protection switching on an optical network according to an embodiment in the present disclosure.

One embodiment of the present disclosure provides a system for controlling protection switching on an optical network including, as shown in FIG. 4, a low-frequency signal mapper 100, a low-frequency signal modulator 200 and a low-frequency signal detector 300.

The low-frequency signal mapper 100 is configured to determine a low-frequency signal for service protection, and transmit low-frequency signal information to the low-frequency signal modulator 200 and the low-frequency signal detector 300.

The low-frequency signal modulator 200 is configured to modulate the low-frequency signal for service protection to a transmission channel of a service signal to be protected.

The low-frequency signal detector 300 is configured to detect the low-frequency signal over the transmission channel, and acquire transmission quality information of the low-frequency signal, and determine whether to perform protection switching according to the transmission quality information of the low-frequency signal.

In one example, that the low-frequency signal mapper 100 determines a low-frequency signal for service protection includes: determining a low-frequency signal for service protection of each protection entity when there are a plurality of protection entities. Herein, the multiple protection entities may correspond to low-frequency signals for service protection of different frequencies. One way for the determination is: determining a low-frequency band for the service protection, dividing the low-frequency band into a plurality of frequency bands, and mapping each of the frequency bands to a protection entity. Herein, the low-frequency signal information includes frequency band information of the low-frequency signal, and may further include other information like wave-form information of the low-frequency signal.

In one example, that the low-frequency signal modulator 200 modulates the low-frequency signal for service protection to a transmission channel of a service signal to be protected includes: modulating to the protection entity the low-frequency signal that has a mapping relationship with the protection entity where the service signal to be protected locates.

In one example, that the low-frequency signal detector 300 detects the low-frequency signal over the transmission channel includes:

detecting the low-frequency signal—that has a mapping relationship with a single protection entity-over the transmission channel; or detecting a plurality of low-frequency signals over the transmission channel, each of the plurality of low-frequency signals mapping a protection entity.

Figure 5:
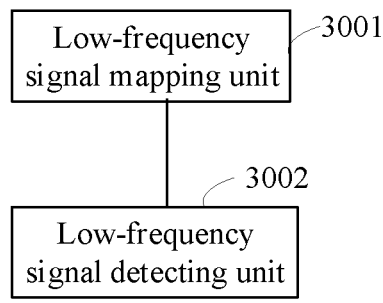
FIG. 5 is a block diagram of a device for controlling protection switching on an optical network according to an embodiment in the present disclosure.

One embodiment of the present disclosure provides a device for controlling protection switching on an optical network, i.e., the low-frequency signal detector 300, including, as shown in FIG. 5, a low-frequency signal mapping unit 3001 and a low-frequency signal detecting unit 3002.

Herein, the low-frequency signal mapping unit 3001 is configured to acquire information of a low-frequency signal for service protection.

The low-frequency signal detecting unit 3002 is configured to detect the low-frequency signal for service protection over the transmission channel of the service signal, acquire transmission quality information of the low-frequency signal, and decide whether to perform protection switching according to the transmission quality information of the low-frequency signal.

The low-frequency signal mapping unit 3001 may acquire the low-frequency signal information from the low-frequency signal mapper 100; and the low-frequency signal information may further be preconfigured in the low-frequency signal mapping unit 3001.

In one example, that the low-frequency signal detecting unit 3002 detects a low-frequency signal for service protection on a transmission channel of a service signal includes: detecting the low-frequency signal—that has a mapping relationship with a single protection entity-over the transmission channel of the service signal; or detecting a plurality of low-frequency signals over the transmission channel of the service signal, each of the plurality of low-frequency signals mapping a protection entity.

Figure 6:
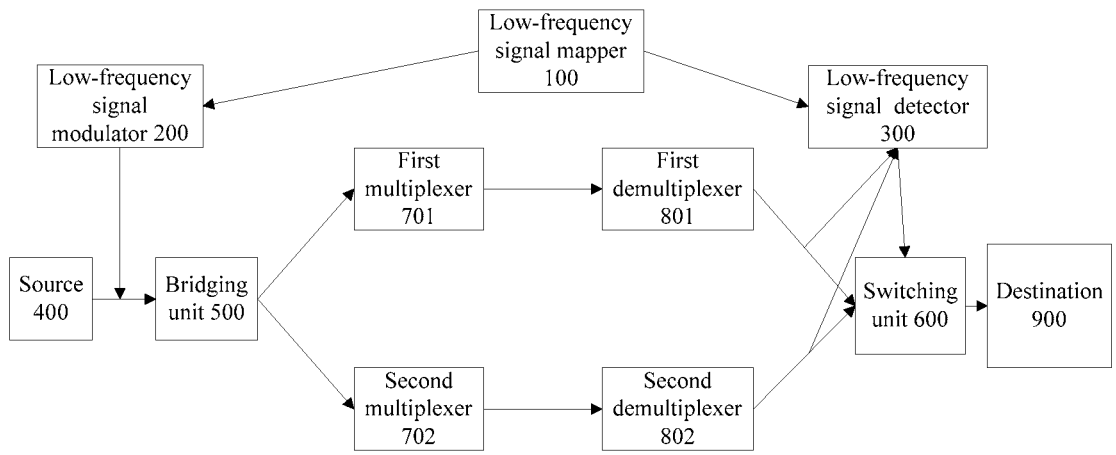
FIG. 6 is a schematic diagram showing a scenario for performing optical channel service protection by integrating a protection system based on low-frequency signal mapping according to an embodiment in the present disclosure.

FIG. 6 is a schematic diagram of a system for controlling protection switching on an optical network according to an embodiment in the present disclosure. As shown in FIG. 6, the system includes a low-frequency signal mapper 100, a low-frequency signal modulator 200, a low-frequency signal detector 300, a source 400, a bridging unit 500, a first multiplexer 701, a second multiplexer 702, a first demultiplexer 801, a second demultiplexer 802, a switching unit 600 and a destination 900.

The low-frequency signal mapper 100 maps a protection entity with a low-frequency signal according to a requirement of a current protection (for example, distributing for the protection entity a low-frequency band for service protection), and notifies the low-frequency signal modulator 200 and the low-frequency signal detector 300 of mapping information (a corresponding relationship between protection entities and low-frequency bands).

Upon receiving a distributed low-frequency signal band, the low-frequency signal modulator 200 modulates a corresponding low-frequency signal into an optical signal emitted from the source 400. The modulated optical signal is transmitted to the bridging unit 500. The bridging unit 500 transmits the optical signal to the first multiplexer 701 and/or the second multiplexer 702 as required. The first multiplexer 701 and the second multiplexer 702 multiplex the received optical signal and transmit the multiplexed optical signal through an optical fiber to a receiving terminal, in particular, respectively to the first demultiplexer 801 and the second demultiplexer 802 of the receiving terminal.

The low-frequency signal detector 300 detects the low-frequency signal in the demultiplexed optical signal output from the first demultiplexer 801 and the second demultiplexer 802, acquires transmission quality information of the low-frequency signal, decides whether to perform protection switching according to the transmission quality information of the low-frequency signal, and transmits a switching command to the switching unit 600 upon a decision to switch.

Upon receiving the switching command, the switching unit 600 performs protection switching.

In this embodiment, service signal quality is determined by detecting the low-frequency signal to determine whether to perform protection switching. Since the low-frequency signal is transmitted along with the service signal, the transmission quality of the low-frequency signal may directly show a high-rate service signal of the channel, and can more accurately show signal quality of the service signal to be protected compared with simple detection of optical power and OSNR. In addition, in the related art, if the power or OSNR of the service signals (high-frequency signals) of a plurality of channels are directly detected, the cost is high; therefore, high-frequency service signals of the plurality of channels are generally separated and then the power or OSNR of the service signals is detected, for determining whether to perform protection switching. In the present disclosure, however, since the low-frequency signal is detected to decide whether to perform switching, signals of channels may not be separated, but the low-frequency signals of each channel may be directly detected to determine quality of signals in each channel, and further to decide whether to perform protection switching, thereby complexity of detection is reduced. Besides, because of the coherent demodulation technique in an optical network of an ultra-high rate, in order to realize network building with a lower cost, a filtering process is usually omitted in a service of a single wavelength channel to directly drop to a service analysis board. In this case, it is difficult to independently detect an optical power and OSNR in a service of a drop signal. In the solution of the present disclosure, signals of channels with various wave lengths do not need to be separated, but they may be directly detected. Therefore, the solution provided in the present disclosure may greatly improve fault detect efficiency and detection accuracy.

Figure 7:
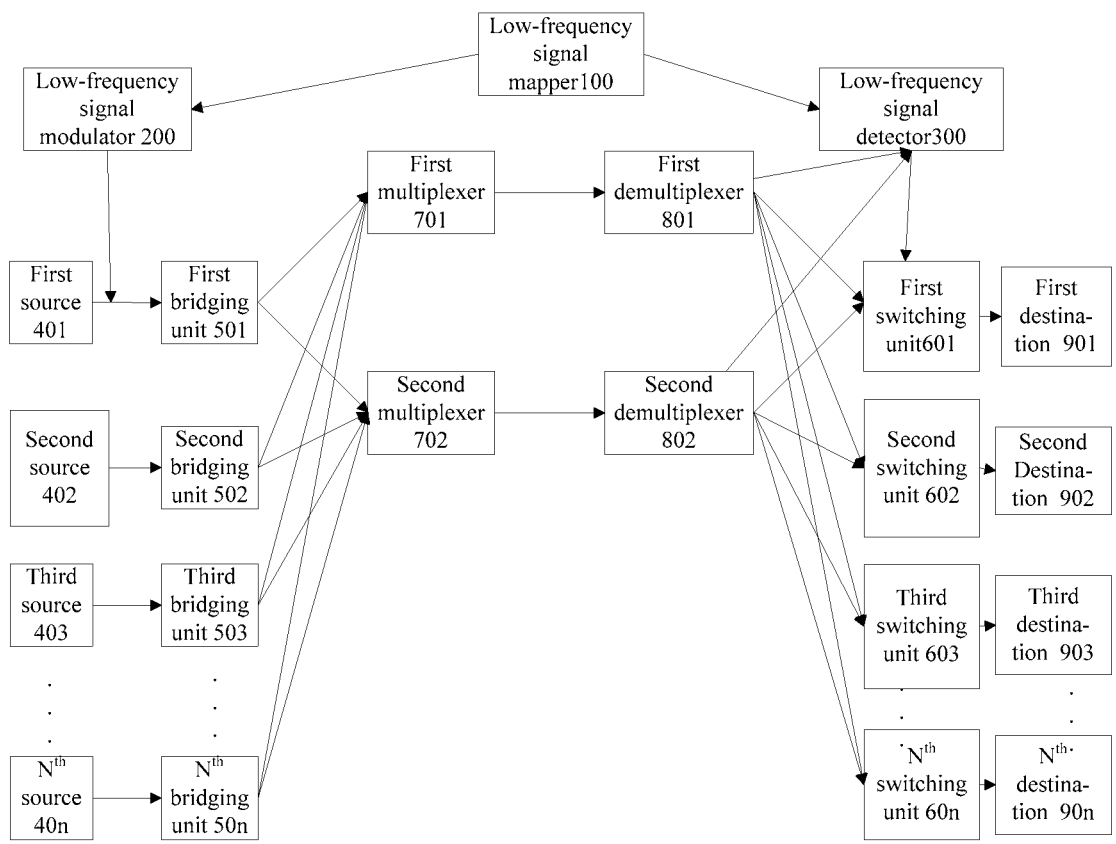
FIG. 7 is another schematic diagram showing a scenario for performing optical channel service protection by integrating a protection system based on low-frequency signal mapping according to another embodiment in the present disclosure.

FIG. 7 is another schematic diagram of a protection system based on low-frequency signal mapping according to another embodiment in the present disclosure. The protection of an optical fiber line in FIG. 7 is in the same way as that in FIG. 6. Because one optical fiber line can multiplex a plurality of channels, FIG. 7 shows protection of n optical channels. Herein, sources of the optical channels respectively are a first source 401, a second source 402, a third source 403, . . . , and an $n^{th}$ source 40n. Destinations respectively are a first destination 901, a second destination 902, a third destination 903, . . . , and an $n^{th}$ destination 90n.

The sources and the destinations are respectively bridged through a first bridging unit 501, a second bridging unit 502, a third bridging unit 503, . . . , and an $n^{th}$ bridging unit 50n to the first multiplexer 701 and the second multiplexer 702 for multiplexing. The first multiplexer 701 and the second multiplexer 702 are then respectively connected to the first demultiplexer 801 and the second demultiplexer 802 for demultiplexing which are then connected to a first switching unit 601, a second switching unit 602, a third switching unit 603, . . . , and an $n^{th}$ switching unit 60n. The low-frequency signal modulator 200 respectively modulates service signals from the first source 401, the second source 402, the third source 403, . . . , and the $n^{th}$ source 40n, and modulates a low-frequency signal into a service signal and transmits the service signal to a corresponding bridging unit. The low-frequency signal detector 300 may detect low-frequency signals before and after the first demultiplexer 801 and the second demultiplexer 802 demultiplex signals, decide whether to perform protection switching, and transmit a switching command to a corresponding switching unit when deciding to perform the protection switching. It shall be noted that FIG. 7 does not show a connection relationship between the low-frequency signal modulator 200 and the first source 402, the second source 402, the third source 403, . . . , and the $n^{th}$ source 40n, and does not show a connection relationship between the low-frequency signal detector 300 and the second switching unit 602, the third switching unit 603, . . . , and the $n^{th}$ switching unit 60n.

According to the protection system in FIG. 7, there are a plurality of services to be protected, and all the services are transmitted through an independent optical channel, and an optical multiplex section is formed at the first multiplexer 701 and the second multiplexer 702. Therefore, all channels may be simply mapped to a frequency range far lower than a current system service signal frequency. For example, a frequency of a service signal is 100 GHz, it is defined that 0.9 to 1 MHz is a low-frequency signal frequency band for service protection, and each channel is mapped to a frequency position of 0.9+0.1/n.

Figure 8:
FIG. 8 is a schematic frequency spectrum diagram showing a normal case where an optical channel service protection service is executed according to an embodiment in the present disclosure.
Figure 9:
FIG. 9 is a schematic frequency spectrum diagram showing an abnormal case where an optical channel service protection service is executed according to an embodiment in the present disclosure.

In another example, in order to save a cost of forming the system, for a coherent system, the first demultiplexer 801 and the second demultiplexer 802 in the system shown in FIG. 7 may be substituted by an optical device that can not perform demultiplexing. The optical device only broadcasts an optical signal of the optical fiber line to the first switching unit 601, the second switching unit 602, the third switching unit 603, . . . , and the $n^{th}$ switching unit 60n. The low-frequency signal detector 300 may directly detect low-frequency signals of all channels, thus low-frequency signals of each channel may be detected. In the example, in a case where all channels work normally, a frequency spectrum of a low-frequency signal detected at the low-frequency signal detector 300 is shown in FIG. 8, and frequency spectrums of low-frequency signals corresponding to all channels exist. If an optical fiber line from the first multiplexer 701 to the first demultiplexer 801 breaks, the low-frequency signal detector 300 detects that all frequency point signals in the frequency spectrum disappear, and the low-frequency signal detector 300 will notify all switching units (the first switching unit 601, the second switching unit 602, the third switching unit 603, . . . , and the $n^{th}$ switching unit 60n) of implementing service protection. If an optical fiber line from the first bridging unit 501 to the first multiplexer 702 breaks, the low-frequency signal detector 300 detects the frequency spectrum shown in FIG. 9, and a frequency spectrum of a low-frequency signal corresponding to the first channel disappears (the part shown by the dotted line in FIG. 9). Therefore, there is a fault to a service of the first channel, and the low-frequency signal detector 300 will notify the first switching unit 601 to implement service protection. In this way, it is able to solve the problem that whether service protection needs to be activated can not be effectively determined when using a related art in the scenario of the present application. It shall be noted that description is provided based on the example of detecting a frequency spectrum of a low-frequency signal, but whether to perform protection switching can be decided by detecting an error rate of the low-frequency signal or protocol information carried in the low-frequency signal. Besides, when detecting the error rate of the low-frequency signal and the protocol information carried in the low-frequency signal, demultiplexing may not be performed, but error rates of low-frequency signals and protocol information carried in the low-frequency signals of all channels may be detected directly. Besides, the modulation and detection position of the low-frequency signal may be another position of the entire protection system. For example, modulation is implemented by directly using the source 400, i.e., the low-frequency signal modulator 200 is integrated in the source 400. Further, the low-frequency signal modulator 200 may be an independent functional module. The low-frequency signal detector 300 may either be an independent functional module, or may be set in another module of the system, for example, in a switching unit. When there are a plurality of switching units, a low-frequency signal detector 300 may be set in each switching unit; or the low-frequency signal detector 300 may be set in one switching unit and it is controlled whether other switching units perform switching according to transmission quality information of the low frequency signals. That is, when it is determined that a certain protection entity requires protection switching, a switching command is transmitted to a corresponding switching unit.

Figure 10:
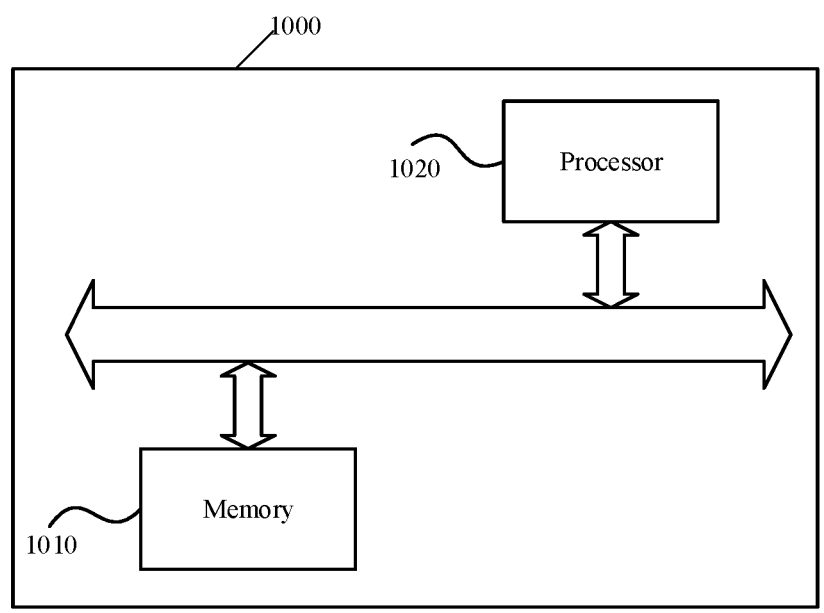
FIG. 10 is a block diagram of a device for controlling protection switching on an optical network according to another embodiment in the present disclosure.

One embodiment of the present disclosure provides a device for controlling protection switching on an optical network 1000. As shown in FIG. 10, the optical network protection switching control device 1000 includes a memory 1010 and a processor 1020. The memory 1010 stores a program that, when read and executed by the processor 1020, implements the method for controlling protection switching on an optical network according to any one of the above embodiments.

One embodiment of the present disclosure provides a computer readable storage medium that stores one or more programs executable by one or more processors to implement the method for controlling protection switching on an optical network according to any one of the above embodiments.

The computer readable storage medium may be a medium capable of storing a program code, for example, a USB drive, a read-only memory (ROM), a random access memory (RAM), a mobile hard disc, a magnetic disc or an optical disc.

Although the embodiments disclosed in the present disclosure are described above, the content is only for facilitating understanding the present disclosure, and is not intended to limit the present disclosure. Any skilled person in the art may make amendments to forms and details of implementation of the present disclosure without departing from the spirit and scope of the present disclosure, but the patent protection scope of the present disclosure shall still be the scope defined by the Claims.

What is claimed is:

1. A method for controlling protection switching on an optical network, comprising:
    determining a low-frequency signal for service protection, and modulating the low-frequency signal for service protection to a transmission channel of a service signal to be protected;
    detecting the low-frequency signal at any position of the transmission channel after a position for modulating the low-frequency signal, and acquiring transmission quality information of the low-frequency signal; and
    determining whether to perform protection switching according to the transmission quality information of the low-frequency signal.

2. The method for controlling protection switching on an optical network according to claim 1, wherein the determining the low-frequency signal for service protection comprises:
    determining a low-frequency band for the service protection,
    dividing the low-frequency band into a plurality of frequency bands, and
    mapping each of the frequency bands to a protection entity.

3. The method for controlling protection switching on an optical network according to claim 2, wherein the detecting the low-frequency signal over the transmission channel comprises:
    detecting the low-frequency signal that has a mapping relationship with a single protection entity over the transmission channel; or
    detecting a plurality of low-frequency signals over the transmission channel, each of the plurality of low-frequency signals mapping a protection entity.

4. The method for controlling protection switching on an optical network according to claim 1, wherein the acquiring the transmission quality information of the low-frequency signal comprises at least one of the following operations:
    acquiring a frequency spectrum of the low-frequency signal;
    acquiring an optical signal to noise ratio of the low-frequency signal;
    acquiring an error rate of the low-frequency signal; and
    acquiring protocol information carried in the low-frequency signal and judging whether the protocol information has an error.

5. A method for controlling protection switching on an optical network, comprising:
    acquiring information of a low-frequency signal for service protection;
    detecting the low-frequency signal at any position of the transmission channel of the service signal after a position for modulating the low-frequency signal, and acquiring transmission quality information of the low-frequency signal; and
    determining whether to perform protection switching according to the transmission quality information of the low-frequency signal.

6. The method for controlling protection switching on an optical network according to claim 5, wherein the acquiring the transmission quality information of the low-frequency signal at least comprises one of the following operations:
    acquiring a frequency spectrum of the low-frequency signal;
    acquiring an optical signal to noise ratio of the low-frequency signal;
    acquiring an error rate of the low-frequency signal;

acquiring protocol information carried in the low-frequency signal and judging whether the protocol information has an error.

7. The method for controlling protection switching on an optical network according to claim 5, wherein the acquiring the low-frequency signal information for service protection comprises:

acquiring information of the low-frequency signal corresponding to each protection entity; and the detecting the low-frequency signal for service protection over the transmission channel of the service signal comprises:

detecting the low-frequency signal that has a mapping relationship with a single protection entity over the transmission channel of the service signal; or detecting a plurality of low-frequency signals over the transmission channel of the service signal, each of the plurality of low-frequency signals mapping a protection entity.

8. A device for controlling protection switching on an optical network, comprising a memory and a processor, wherein the memory stores a program that, when read and executed by the processor, implements a method for controlling protection switching on an optical network, comprising:

acquiring information of a low-frequency signal for service protection;

detecting the low-frequency signal at any position of the transmission channel of the service signal after a position for modulating the low-frequency signal, and acquiring transmission quality information of the low-frequency signal; and determining whether to perform protection switching according to the transmission quality information of the low-frequency signal.

9. The device for controlling protection switching on an optical network according to claim 8, wherein the acquiring the transmission quality information of the low-frequency signal at least comprises one of the following operations:

acquiring a frequency spectrum of the low-frequency signal;

acquiring an optical signal to noise ratio of the low-frequency signal;

acquiring an error rate of the low-frequency signal;

acquiring protocol information carried in the low-frequency signal and judging whether the protocol information has an error.

10. The device for controlling protection switching on an optical network according to claim 8, wherein the acquiring the low-frequency signal information for service protection comprises:

acquiring information of the low-frequency signal corresponding to each protection entity; and the detecting the low-frequency signal for service protection over the transmission channel of the service signal comprises:

detecting the low-frequency signal that has a mapping relationship with a single protection entity over the transmission channel of the service signal; or detecting a plurality of low-frequency signals over the transmission channel of the service signal, each of the plurality of low-frequency signals mapping a protection entity.

* * * * *